US008694368B2

(12) United States Patent
Berwitz et al.

(10) Patent No.: US 8,694,368 B2
(45) Date of Patent: Apr. 8, 2014

(54) METHOD, SYSTEM, AND COMPUTER PROGRAM PRODUCT FOR SPEND MAPPING TOOL

(75) Inventors: Joshua M. Berwitz, New York, NY (US); Guillaume J. Bouvard, New York, NY (US); Charles C. Lyon, New York, NY (US); Jon K. Ruterman, Glendale, AZ (US); Joseph M. Zeltzer, Hoboken, NJ (US)

(73) Assignee: American Express Travel Related Services Company, Inc., New York, NY (US)

( * ) Notice: Subject to any disclaimer, the term of this patent is extended or adjusted under 35 U.S.C. 154(b) by 1421 days.

(21) Appl. No.: 11/608,644

(22) Filed: Dec. 8, 2006

(65) Prior Publication Data

US 2008/0140503 A1 Jun. 12, 2008

(51) Int. Cl.
*G06Q 30/00* (2012.01)
*G06Q 30/02* (2012.01)
*G06K 19/077* (2006.01)

(52) U.S. Cl.
CPC ........ *G06Q 30/0271* (2013.01); *G06Q 30/0276* (2013.01); *G06K 19/07749* (2013.01)
USPC .................. 705/14.17; 705/14.26; 705/14.27; 235/492

(58) Field of Classification Search
None
See application file for complete search history.

(56) References Cited

U.S. PATENT DOCUMENTS

| | | | | |
|---|---|---|---|---|
| 5,255,182 A | * | 10/1993 | Adams | 705/17 |
| 5,787,404 A | * | 7/1998 | Fernandez-Holmann | 705/35 |
| 5,970,469 A | * | 10/1999 | Scroggie et al. | 705/14.26 |
| 6,254,000 B1 | * | 7/2001 | Degen et al. | 235/380 |
| 6,419,161 B1 | * | 7/2002 | Haddad et al. | 235/492 |
| 6,490,568 B1 | * | 12/2002 | O'Mara et al. | 705/39 |
| 6,722,573 B2 | * | 4/2004 | Haddad et al. | 235/492 |
| 7,363,308 B2 | * | 4/2008 | Dillon et al. | 707/706 |
| 7,376,618 B1 | * | 5/2008 | Anderson et al. | 705/38 |
| 7,392,224 B1 | * | 6/2008 | Bauer et al. | 705/41 |
| 7,653,572 B1 | * | 1/2010 | Thompson | 705/14.34 |
| 8,095,498 B2 | * | 1/2012 | Rollins et al. | 707/600 |
| 2002/0040925 A1 | * | 4/2002 | Weber | 235/379 |
| 2002/0082920 A1 | * | 6/2002 | Austin et al. | 705/14 |
| 2002/0116264 A1 | * | 8/2002 | Feidelson et al. | 705/14 |
| 2002/0117541 A1 | * | 8/2002 | Biggar et al. | 235/379 |
| 2003/0018613 A1 | * | 1/2003 | Oytac | 707/1 |
| 2003/0093314 A1 | * | 5/2003 | Leung et al. | 705/14 |
| 2003/0229584 A1 | * | 12/2003 | Brown | 705/39 |
| 2004/0044571 A1 | * | 3/2004 | Bronnimann et al. | 705/14 |
| 2004/0122736 A1 | * | 6/2004 | Strock et al. | 705/14 |
| 2004/0181453 A1 | * | 9/2004 | Ray et al. | 705/16 |

(Continued)

OTHER PUBLICATIONS

Saarenvirta, Gary. "Mining customer data: a step-by-step look at a powerful clustering and segmentation methodology." DB2 Magazine online (1998).*

(Continued)

*Primary Examiner* — Gurkanwaljit Singh
(74) *Attorney, Agent, or Firm* — Snell & Wilmer L.L.P.

(57) ABSTRACT

A spend mapping tool provides a system, method, and computer program product for analyzing transactions between merchants and cardmembers. The tool groups a merchant by industry in a merchant industry group. The tool also groups a cardmember by industry in a cardmember industry group. Further, the tool analyzes transaction data from a transaction between at least one merchant in said merchant industry group and at least one cardmember in said cardmember industry group.

17 Claims, 12 Drawing Sheets

(56) References Cited

U.S. PATENT DOCUMENTS

| | | | |
|---|---|---|---|
| 2004/0199422 A1* | 10/2004 | Napier et al. | 705/14 |
| 2005/0086112 A1* | 4/2005 | Shkedi | 705/14 |
| 2005/0105513 A1* | 5/2005 | Sullivan et al. | 370/352 |
| 2005/0222906 A1* | 10/2005 | Chen | 705/14 |
| 2005/0240477 A1* | 10/2005 | Friday et al. | 705/14 |
| 2006/0122879 A1* | 6/2006 | O'Kelley | 705/14 |
| 2006/0143072 A1* | 6/2006 | Herman et al. | 705/10 |
| 2006/0255137 A1* | 11/2006 | Wagner et al. | 235/385 |
| 2007/0143172 A1* | 6/2007 | Bhagchandani et al. | 705/10 |
| 2007/0291739 A1* | 12/2007 | Sullivan et al. | 370/352 |
| 2009/0248506 A1* | 10/2009 | Goldstein et al. | 705/14 |
| 2010/0153332 A1* | 6/2010 | Rollins et al. | 707/603 |

OTHER PUBLICATIONS

Nelson, Richard Alan, Ali M. Kanso, and Steven R. Levitt. "Integrating public service and marketing differentiation: an analysis of the American Express Corporation's "Charge Against Hunger" promotion program." Service Business1.4 (2007): 275-293.*

Levitin, Adam J. "Priceless? The Economic Costs of Credit Card Merchant Restraints."*

McCorkell, G. R. A. E. M. E. "What are direct marketing and interactive marketing?." The Marketing Book: 565.*

Montgomery, D. B., & Urban, G. L. (1970). Computer applications: Marketing decision-information systems: An emerging view. JMR, Journal of Marketing Research (Pre-1986), 7(000002), 226.*

* cited by examiner

|  | SIC01 | SIC02 | SIC03 |
|---|---|---|---|
| SIC01 | Empty 304 | 150A 302 | Empty |
| SIC02 | Empty | Empty | 150B |
| SIC03 | 150D 150N | 150C 150E | Empty |

Merchant Industry Code 200
Cardmember Industry Code 250

FIG. 3

- 151A — merchant name: Alpha Corporation
- 153A — cardmember name: Bravo Corporation
- 164A — transaction value: $10,000
- 450 — merchant number: 839375484
- 452 — cardmember account number: 3715 9547 1047 9473
- 454 — number of transactions per merchant: 10,483
- 456 — number of transactions per cardmember: 4,923
- 458 — merchant geographical location: Whitehall, NY (USA)
- 460 — cardmember geographical location: Kittery, ME (USA)
- 462 — merchant tenure: 45 months
- 464 — cardmember tenure: 128 months
- 466 — card product description: American Express Business Gold Rewards Card
- 468 — other data related to a transaction: XXXXX

FIG. 4

| Cardmember Industry Code 250 / Merchant Industry Code 200 | Total number of transactions per cardmember Industry Group 504 | SIC01 | SIC02 | SIC03 |
|---|---|---|---|---|
| Total number of transactions per merchant Industry Group 506 | X | 1 | 1 | 4 |
| SIC01 | 2 | 0 | 0 | 2 |
| SIC02 | 3 | 1 | 0 | 2 |
| SIC03 | 1 | 0 | 1 | 0 |

FIG. 5

| Merchant Industry Code 200 / Cardmember Industry Code 250 | Total Cardmember Industry Group Transaction Value 604 | SIC01 | SIC02 | SIC03 |
|---|---|---|---|---|
| Total merchant Industry Group Transaction Value 606 | X | $10,000 | $10,000 | $15,500 |
| SIC01 | $3,000 | 0 | 0 | $3,000 |
| SIC02 | $22,500 | $10,000 | 0 | $12,5000 |
| SIC03 | $10,000 | 0 | $10,000 | 0 |

FIG. 6A

| Cardmember SIC-2 \ Merchant SIC-2 | TOTAL | 01 Agricultural Production - Crops | 02 Agricultural Production - Livestock and Animal Specialties | 07 Agricultural Services | 08 Forestry |
|---|---|---|---|---|---|
| TOTAL | 140,000 | 42,000 | 19,000 | 39,500 | 39,500 |
| Missing | 15,500 | 8,000 | 1,000 | 500 | 6,000 |
| 01: Agricultural Production - Crops | 23,000 | 10,000 | 4,000 | 6,000 | 3,000 |
| 02: Agricultural Production - Livestock and Animal Specialties | 10,500 | 5,000 | 3,000 | 2,000 | 500 |
| 07: Agricultural Services | 27,000 | 4,000 | 1,000 | 12,000 | 10,000 |
| 08: Forestry | 15,000 | 1,000 | 6,000 | 1,000 | 7,000 |
| 09: Fishing, Hunting, and Trapping | 43,000 | 14,000 | 4,000 | 12,000 | 13,000 |
| 10: Metal Mining | 6,000 | 0 | 0 | 6,000 | 0 |

FIG. 6B

METHOD, SYSTEM, AND COMPUTER PROGRAM PRODUCT FOR SPEND MAPPING TOOL

BACKGROUND OF THE INVENTION

1. Field of the Invention

The present invention relates generally to analysis of financial transactions between parties and, more particularly, to analyzing financial transactions between groups of industries.

2. Background Art

Marketing and advertising of financial services and products to businesses broadly targets potential and current customers. Financial services and products include financial transaction instruments such as credit cards. Traditional marketing and industry analysis does not always identify specific needs of specific business customers. As a result, traditional marketing and segmentation of financial services and products to businesses is not always accurate because it does not effectively identify specific needs of specific groups of business customers. In addition, traditional advertising of financial services and products to businesses uses a broad approach that inaccurately and inefficiently targets business customers because the advertising does not effectively convey how the financial services and products provide satisfaction of specific business customer needs. Furthermore, traditional advertising also does not evaluate the effect of advertisements based on industry transactions between targeted markets. Moreover, traditional marketing and advertising sub-optimally encourages transactions between specific customer industries.

In addition to these problems, conventional financial transaction risk profiling is often inaccurate because it does not take into account transaction risk based on the industries of the respective parties.

BRIEF SUMMARY OF THE INVENTION

A spend mapping tool provides a system, method, and computer program product for analyzing transactions between merchants and cardmembers. The tool groups a merchant by industry in a merchant industry group. The tool also groups a cardmember by industry in a cardmember industry group. Further, the tool analyzes transaction data from a transaction between at least one merchant in the merchant industry group and at least one cardmember in the cardmember industry group.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and enable a person skilled in the pertinent art to make and use the invention.

FIG. 3 illustrates analysis of transaction data between merchant industry groups and cardmember industry groups;

FIG. 4 illustrates exemplary transaction data;

FIG. 5 illustrates analysis of number of transactions between industry groups;

FIG. 6A illustrates analysis of transaction value between industry groups;

FIG. 6B is an exemplary screen shot generated by the spend mapping tool;

The present invention will be described with reference to the accompanying drawings. The drawing in which an element first appears is typically indicated by the leftmost digit(s) in the corresponding reference number.

DETAILED DESCRIPTION

I. Overview

Figure 1A:
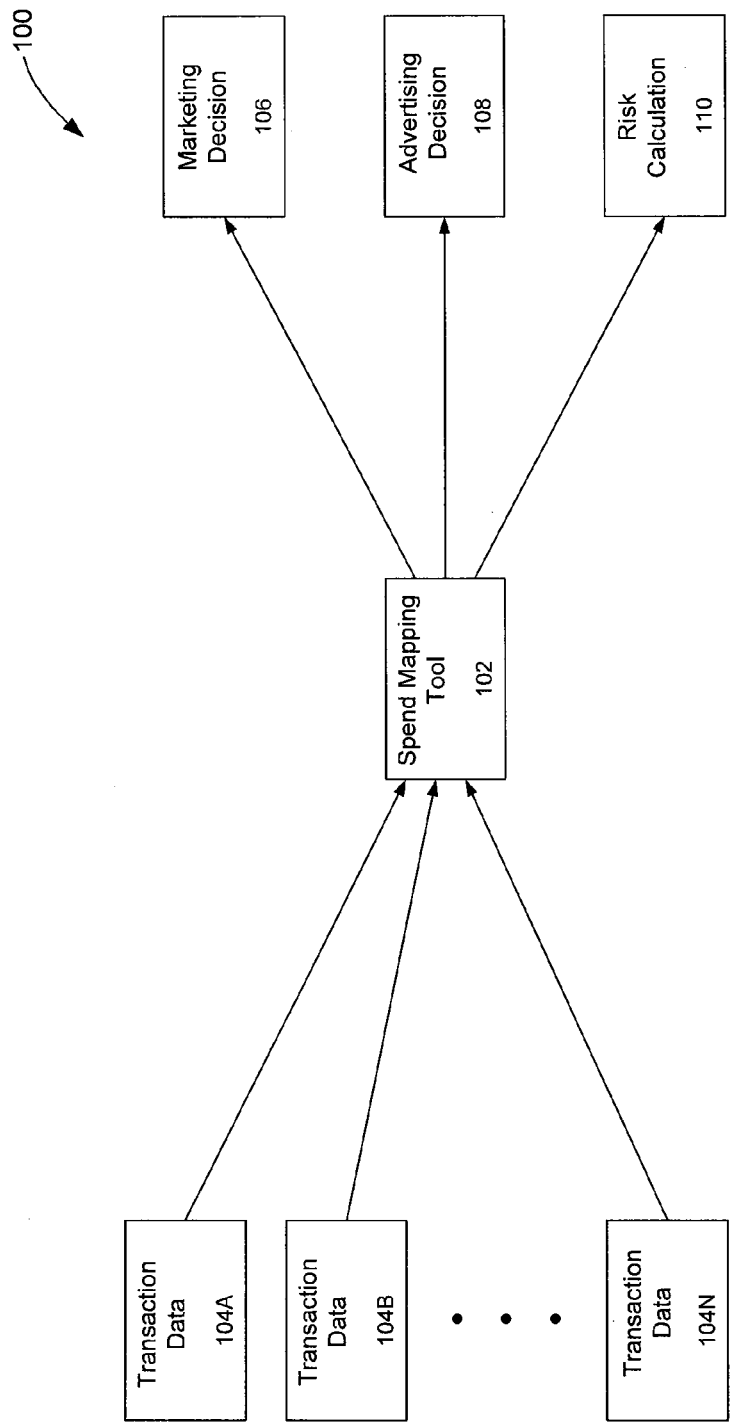
FIG. 1A illustrates an implementation of a spend mapping tool.

A spend mapping tool provides a system, method, and computer program product to analyze business-to-business transactions between a merchant industry group and a cardmember industry group. An advantage of the spend mapping tool is that it identifies underdeveloped business-to-business markets. It also identifies and clarifies market characteristics of a business-to-business market between the merchant industry group and the cardmember industry group.

Identification of market characteristics enables more accurate and more efficient marketing and market segmentation because it identifies specific needs, as well as absence of needs, of specific business customers in specific markets. The desirability of markets is also more accurately identified.

In addition, the spend mapping tool improves accuracy and efficiency of developing an industry strategy as well as aligning products and services with appropriate customers and merchants. The spend mapping tool also Market characteristics may also be used as input to a transaction risk calculation to improve accuracy of a risk calculation.

Further, identifying market characteristics enables more accurate and efficient advertising because an advertising effort can more accurately target a specific desirable market while avoiding a less desirable market. Market characteristics also may be used to tailor advertising content to a target market. Trend analysis of market characteristics may be used to evaluate impact of advertising.

The transaction analysis is performed on transaction data such as the number of transactions, transaction amount, number of merchant accounts, number of cardmember accounts, transaction geography, card product use, merchant account tenure, and cardmember account tenure as well as other data. Trend analysis may be performed on analysis results, such as market characteristics, to produce time-dependent results.

The tool operates as follows. Transaction data from a plurality of transactions between merchants and cardmembers is input to the tool. The tool groups individual merchants by industry into an appropriate merchant industry group. The tool groups individual cardmembers by industry into an appropriate cardmember industry group. Each merchant industry group and each cardmember industry group are identified by a respective Standard Industrial Classification (SIC) code. The tool then analyzes transaction data from transactions between cardmembers in a specific cardmember industry group and merchants in a specific merchant industry group. Analysis results are input to at least one of a marketing decision, an advertising decision, and a risk calculation.

While specific configurations and arrangements are discussed, it should be understood that this is done for illustrative purposes only. This specification discloses one or more embodiments that incorporate the features of this invention. The disclosed embodiment(s) merely exemplify the invention. The scope of the invention is not limited to the disclosed embodiment(s). The invention is defined by the claims.

References in the specification to "one embodiment," "an embodiment," "an example embodiment," etc. indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of one skilled in the art to effect such feature, structure, or characteristic in connection with other embodiments whether or not explicitly described.

The terms "user," "end user," "consumer," "customer," "participant," "cardmember," and the plural form of these terms are used interchangeably throughout herein to refer to those persons or entities capable of accessing, using, being affected by, or benefiting from the tool that the present invention provides for spend mapping. A cardmember may be a person or legal entity.

Furthermore, the terms "business" and "merchant" may be used interchangeably with each other and shall mean any person, entity, distributor system, software, or hardware that is a provider, broker, or other entity in the distribution chain of goods or services. For example, a merchant may be a grocery store, a retail store, a travel agency, a service provider, an on-line merchant, or the like. A merchant may be a person or legal entity.

A "transaction account" as used herein refers to an account associated with an open account or a closed account system (as described herein). The transaction account may exist in a physical or non-physical embodiment. For example, a transaction account may be distributed in non-physical embodiments such as an account number, frequent-flyer account, telephone calling account or the like. Furthermore, a physical embodiment of a transaction account may be distributed as a financial transaction instrument. Transaction accounts have data, such as account and merchant numbers, that are used as transaction data.

A "financial transaction instrument" is a physical embodiment of a transaction account. A financial transaction instrument may be traditional plastic transaction cards, metal-containing transaction cards, clear or translucent transaction cards, foldable or otherwise unconventionally-sized transaction cards, radio-frequency enabled transaction cards, or other types of transaction cards, such as credit, charge, debit, pre-paid, or stored-value cards, or any other like financial transaction instrument. A financial transaction instrument may also have electronic functionality provided by a network of electronic circuitry that is printed or otherwise incorporated onto or within the financial transaction instrument (typically referred to as a "smart card"). A financial transaction instrument may be a fob having a transponder and an RFID reader.

"Open cards" are financial transaction cards that are generally accepted at different merchants. Examples of open cards include the American Express®, Visa®, MasterCard® and Discover® cards, which may be used at many different retailers and other businesses. In contrast, "closed cards" are financial transaction cards that may be restricted to use in a particular store, a particular chain of stores or a collection of affiliated stores. One example of a closed card is a pre-paid gift card that may only be purchased at, and only be accepted at, a clothing retailer.

"Stored value cards" are forms of transaction instruments associated with transaction accounts, wherein the stored value cards provide cash equivalent value that may be used within an existing payment/transaction infrastructure. Stored value cards are frequently referred to as gift, pre-paid or cash cards, in that money is deposited in the account associated with the card before use of the card is allowed. For example, if a customer deposits ten dollars of value into the account associated with the stored value card, the card may only be used for payments together totaling no more than ten dollars.

An "account," "account number" or "account code", as used herein, may include any device, code, number, letter, symbol, digital certificate, smart chip, digital signal, analog signal, biometric, or other identifier suitably configured to allow a consumer to access, interact with, or communicate with, a financial transaction system. The account number may optionally be located on or associated with any financial transaction instrument. The account number may be distributed and stored in any form of plastic, electronic, magnetic, radio frequency (RF), wireless, audio or optical device capable of transmitting or downloading data from itself to a second device. A merchant account number may be, for example, at least one alpha-numeric character that identifies a particular merchant for purposes of card acceptance, account reconciliation, reporting, and the like. Similarly, a cardmember account number may be, for example, at least one alpha-numeric character that identifies a particular cardmember for purposes of card acceptance, account reconciliation, reporting, and the like.

Persons skilled in the relevant art will understand the breadth of the terms used herein and that the exemplary descriptions provided are not intended to be limiting of the generally understood meanings attributed to the foregoing terms.

II. Exemplary Implementations

FIG. 1A illustrates a simplified exemplary implementation 100 of a spend mapping tool 102. Transaction data 104A, B, . . . , N is input to spend mapping tool 102. Further details about transaction data 104 are found in FIGS. 1B and 4. The spend mapping tool 102 analyzes the transaction data 104. Further details about analysis performed by the spend mapping tool 102 are found in FIGS. 2A, 2B, 3, 5, 6A, 6B, 6C, 7, and 8. The spend mapping tool 102 provides analysis results for use in at least one of a marketing decision 106, an advertising decision 108, and a risk calculation 110.

Figure 1B:
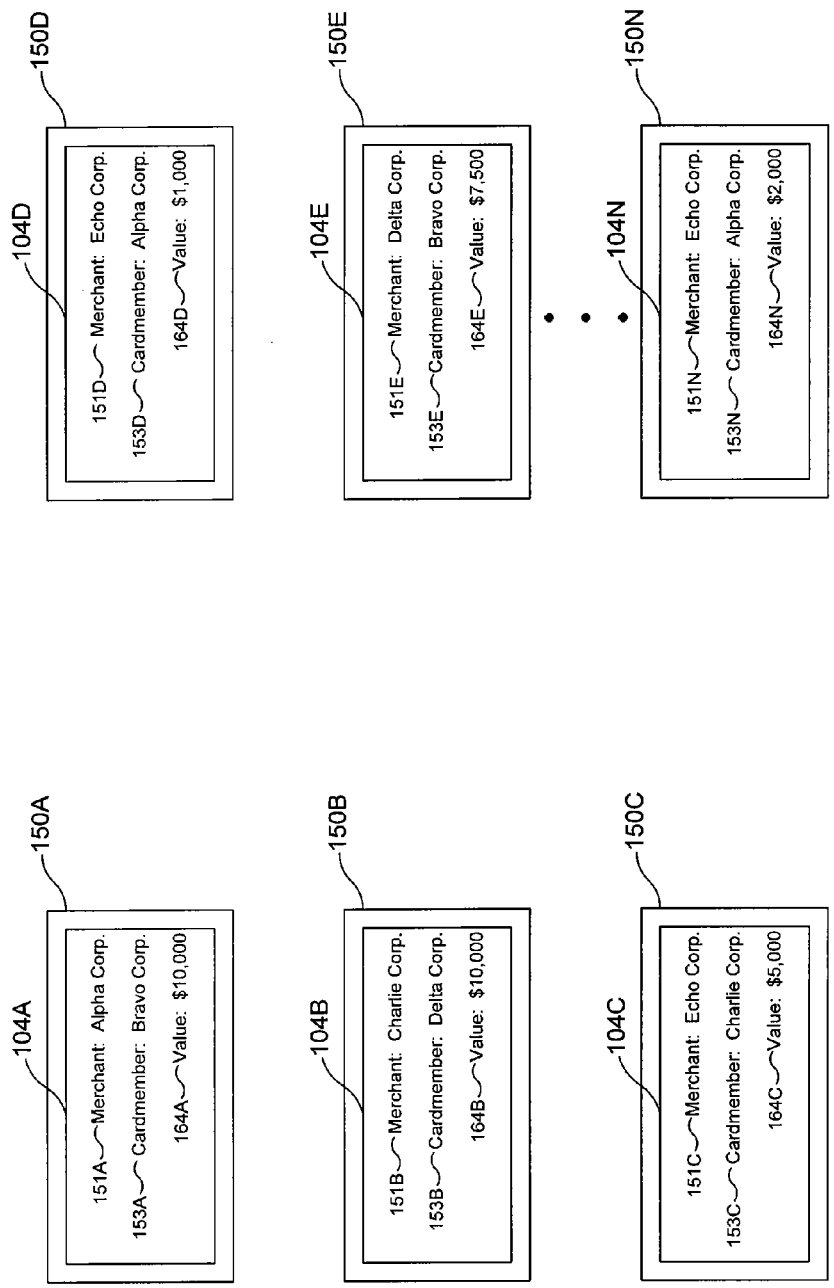
FIG. 1B illustrates transactions between cardmembers and merchants.

FIG. 1B illustrates a plurality of exemplary transactions 150A, B, . . . , N between merchants 151A, B, . . . , N and cardmembers 153A, B, . . . , N. Each cardmember 153 tenders a payment that has transaction value 164A, B, . . . , N. In exchange for payment, merchant 151 provides goods and/or services. Each transaction 150 has associated transaction data 104. Spend mapping tool 102 processes at least transaction 150 and is not limited by quantity of transactions 150.

Figure 2A:
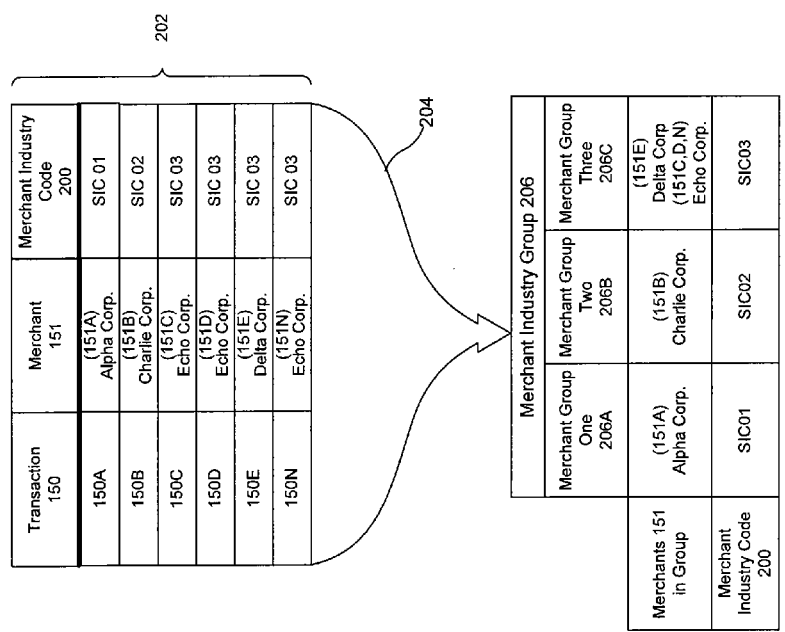
FIG. 2A illustrates grouping of merchants by industry.
Figure 2B:
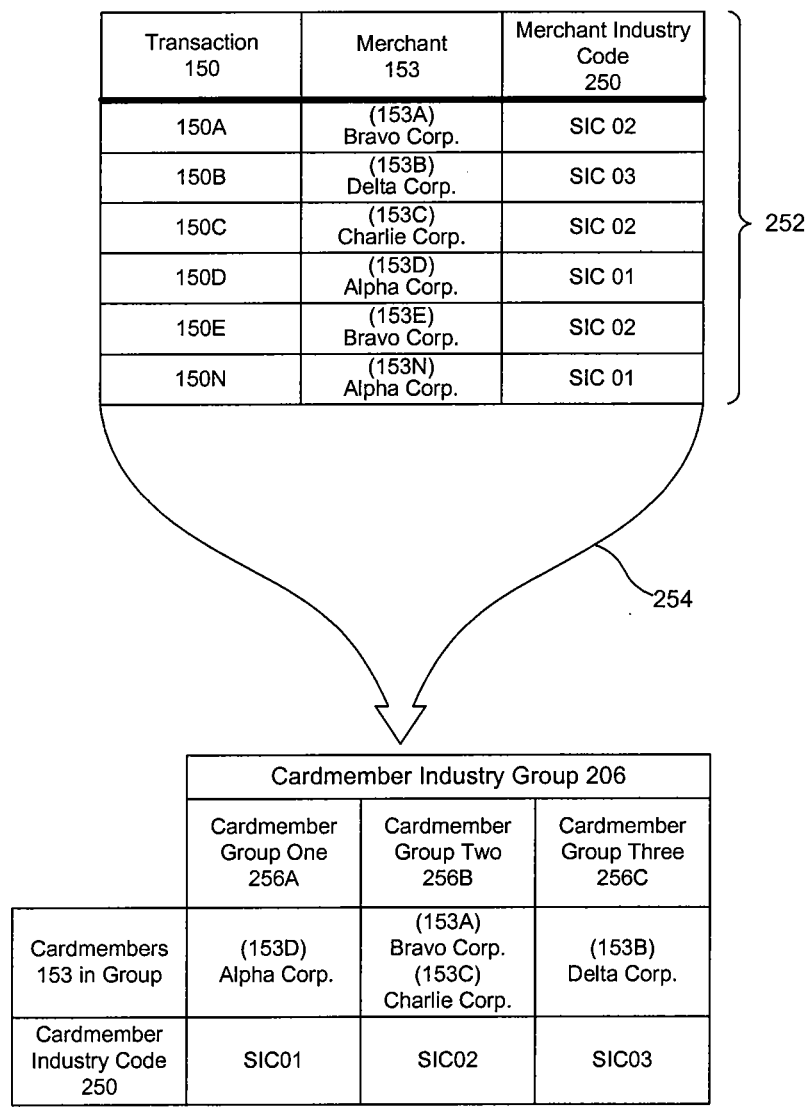
FIG. 2B illustrates grouping of cardmembers by industry.

FIGS. 2A and 2B illustrate an example of classifying and grouping merchants 151 and cardmembers 153 by industry. Spend mapping tool 102 groups each cardmember 153 and merchant 151 into a respective industry group. Each merchant industry group 206 has a merchant industry code 200.

Each cardmember industry group 256 also has a cardmember industry code 250. Merchant industry code 200 and cardmember industry code 250 may be an alphanumeric code having at least one digit. Merchant industry groups 206 and cardmember industry groups 256 may be divided further into sub-groups to provide greater detail. Thus, cardmember 153 and merchant 151 may be grouped by an industry sub-group. The number of industry groups and sub-groups is unlimited. Further, each sub-group has a sub-group industry code. A miscellaneous industry group may be used to identify parties that do not adequately fit into other industry groups.

A Standard Industrial Classification (SIC) code may be used as merchant industry code 200 and cardmember industry code 250. A two-digit or a four-digit SIC code is assigned to each merchant industry group 206 and cardmember industry group 256. One source of SIC codes is Dun and Bradstreet Corporation of Short Hills, N.J.

FIG. 2A illustrates a merchant industry code assignment 202 of a merchant industry code 200 to each merchant 151. The spend mapping tool 102 assigns the respective merchant industry code 200 to each merchant 151. In FIG. 2A, example merchant industry group codes 200 are SIC 01, SIC 02, and SIC 03. In transaction 150A, the merchant 151A is Alpha corporation. Alpha corporation is assigned SIC 01 as merchant industry code 200 because Alpha corporation is in an industry identified by SIC 01. A merchant 151 may be assigned more than one merchant industry code 200. The number of merchant industry codes 200 is at least one.

FIG. 2A also illustrates merchant grouping 204. The spend mapping tool 102 groups merchants 151 having a common merchant industry code 200 into a respective merchant industry group 206A, B, C. In other words, all merchants 151 with the same merchant industry code 200 are grouped together in the same merchant industry group 206. The merchant industry group 206 is identified by the merchant industry code 200 that is common to all members of that merchant industry group 206. FIG. 2A illustrates an exemplary merchant grouping 204 of merchants 151 into respective merchant industry groups 206. For example, merchant 151C, the Echo Corporation, and merchant 151E, the Delta Corporation, both have merchant industry code 200 of SIC 03. Thus, merchant 151C, the Echo Corporation, and merchant 151E, the Delta Corporation, are grouped into the same merchant industry group 206 because both share the same merchant industry code 200 of SIC 03. Any merchant 151 may be a member of more than one merchant industry group 206. Merchant grouping 204 groups a merchant 151 from at least one transaction 150. Merchant grouping 204 is not limited by number of transactions 150.

FIG. 2B illustrates cardmember industry code assignment 252 of cardmember industry code 250 to each cardmember 153. The spend mapping tool 102 assigns the respective cardmember industry code 250 to each cardmember 153. In FIG. 2B, example cardmember industry group codes 250 are SIC 01, SIC 02, and SIC 03. Though the set of cardmember industry group codes 250 is identical to that of merchant industry group codes 200 in this example, the two sets of codes may differ. In transaction 150A, the cardmember 153A is Bravo corporation. Bravo corporation is assigned SIC 02 as cardmember industry code 250 because Bravo corporation is in an industry identified by SIC 02. A cardmember 153 may be assigned more than one cardmember industry code 250. The number of cardmember industry codes 250 is at least one.

FIG. 2B also illustrates cardmember grouping 254. The spend mapping tool 102 groups cardmembers 153 having a common cardmember industry code 250 into a respective cardmember industry group 256A, B, C. In other words, all cardmembers 153 with the same cardmember industry code 250 are grouped together in the same cardmember industry group 256. The cardmember industry group 256 is identified by the cardmember industry code 250 that is common to all members of that cardmember industry group 256. FIG. 2B illustrates an exemplary cardmember grouping 254 of cardmembers 153 into respective cardmember industry groups 256. For example, cardmember 153A, the Bravo Corporation, and cardmember 153C, the Charlie Corporation, both have a cardmember industry code 250 of SIC 02. Thus, cardmember 153A, the Bravo Corporation, and cardmember 153C, the Charlie Corporation, are grouped into the same cardmember industry group 256 because both share the same cardmember industry code 250 of SIC 02. Cardmember 153 may be a member of more than one cardmember industry group 256. Cardmember grouping 254 groups a cardmember 153 from at least one transaction 150. Cardmember grouping 254 is not limited by number of transactions 150.

FIGS. 3-8 illustrate how spend mapping tool 102 analyzes transaction data 104 of transactions 150 between cardmembers 153 in a cardmember industry group 256 and merchants 151 in a merchant industry group 206. FIG. 3 illustrates an example of a two-dimensional array 300. Each column in array 300 represents merchants 151 that share a common merchant industry code 200. The right column of array 300 represents merchants 151 that share a common merchant industry code 200 of SIC 03. Further, each row in array 300 represents cardmembers 153 that share a common cardmember industry code 250. The bottom row of array 300 represents cardmembers 153 that share a common cardmember industry code 250 of SIC 03.

Each intersection between a row and a column forms a cell such as cell 302. Within each cell, transaction data 104 is analyzed for transactions 150 between cardmembers 153 in the cardmember industry group 256 represented by the row and merchants 151 in the merchant industry group 206 represented by the column. If a cell has no transaction 150, then a zero or null value 304 is used to represent transaction data 104 in that empty cell.

For example, first transaction 150A is between merchant Alpha Corporation and cardmember Bravo Corporation. Merchant Alpha Corporation is grouped in the merchant industry group 206A having the merchant industry code 200 of SIC 01. Similarly, cardmember Bravo Corporation is grouped in the cardmember industry group 256B having the cardmember industry code 250 of SIC 02. Cell 302 corresponds to both merchant industry code 200 of SIC 01 and cardmember industry code 250 of SIC 02. Thus, first transaction 150A and associated transaction data 104A are analyzed in cell 302.

FIG. 4 illustrates exemplary transaction data 104A that includes cardmember name 153 and merchant name 151. Transaction data 104 may also include transaction value 164, a merchant number 450, a cardmember account number 452, a number of transactions per merchant 454, a number of transactions per cardmember 456, a merchant geographical location 458, a cardmember geographical location 460, a merchant tenure 462, and a cardmember tenure 464. Merchant tenure 462 is a measure of a period of time the merchant has had a merchant account open with the merchant account issuer. Cardmember tenure 464 is a measure of a period of time the cardmember has had a cardmember account open with the cardmember account issuer. Transaction value 164 may be in United States Dollars. Transaction data 104 may also include a card product description 466. Transaction data 104 is not limited to these types of data and may include other data 468 related to a transaction 150.

Referring to FIG. 5, the spend mapping tool 102 processes transaction data 104 in each cell to analyze transactions 150, and thus a market, between the cardmember industry group 256 and merchant industry group 206 represented by that cell. At least one transaction 150 and associated transaction data 104 are analyzed. Analysis is not limited by the number of transactions 150 or number of cells. FIG. 5 illustrates a spreadsheet output of an exemplary analysis 500 of transaction data 104. The analysis 500 determines a number of transactions 502 between cardmembers 153 in cardmember industry groups 256 and merchants 151 in merchant industry groups 206. For example, a cell 501 indicates there are two transactions between merchants 151 in the merchant industry group 206C having the merchant industry code 200 of SIC 03 and cardmembers 153 in the cardmember industry group 256A having the cardmember industry code 250 of SIC 01.

FIG. 5 further illustrates determining a total number of transactions 504 in cardmember industry group 256 as well as a total number of transactions 506 in merchant industry group 206. For example, the merchant industry group 206C having the merchant industry code 200 of SIC 03 has a total of four transactions 508.

In an exemplary embodiment, the spend mapping tool 102 processes transaction data 104 in each cell to calculate a number of accounts in force (AIF) in each cell. The spend mapping tool 102 may also process transaction data 104 in each cell to calculate a number of active accounts in each cell.

FIG. 6A illustrates a spreadsheet output 600 of an exemplary analysis of transaction data 104. The analysis 600 determines a total transaction amount 602 for transactions 150 between cardmembers 153 in a cardmember industry group 256 and merchants 151 in a merchant industry group 206. For example, cell 601 contains results of analysis of transaction data 104 for transaction 150C and transaction 150E. Transaction 150C has a transaction value 164C of $5,000. Transaction 150E has a transaction value 164E of $7,500. Thus, the total transaction amount 602 for cell 601 is $12,500.

FIG. 6A further illustrates determining a total transaction amount 604 per cardmember industry group 256. A total transaction amount 606 per merchant industry group 206 may also be determined. For example, Delta Corporation and Echo Corporation are merchants in the same merchant industry group 206C that has merchant industry code 200 of SIC 03. Delta Corporation and Echo Corporation are merchants in transactions 150C, 150D, 150E, and 150N. The total transaction value 164 for these four transactions is $15,500. Thus, total transaction amount 606 for merchant industry group 206C is $15,500.

FIG. 6B is an exemplary screen shot 625 generated by spend mapping tool 102 showing total transaction amounts 602 between cardmember industry groups 256 and merchant industry groups 206. FIG. 6B further illustrates determining a total transaction amount 604 per cardmember industry group 256 as well as determining a total transaction amount 606 per merchant industry group 206. Transaction data 104 that is not grouped into either cardmember industry group 256 or merchant industry group 206 is placed into a "missing" cell 627.

Figure 6C:
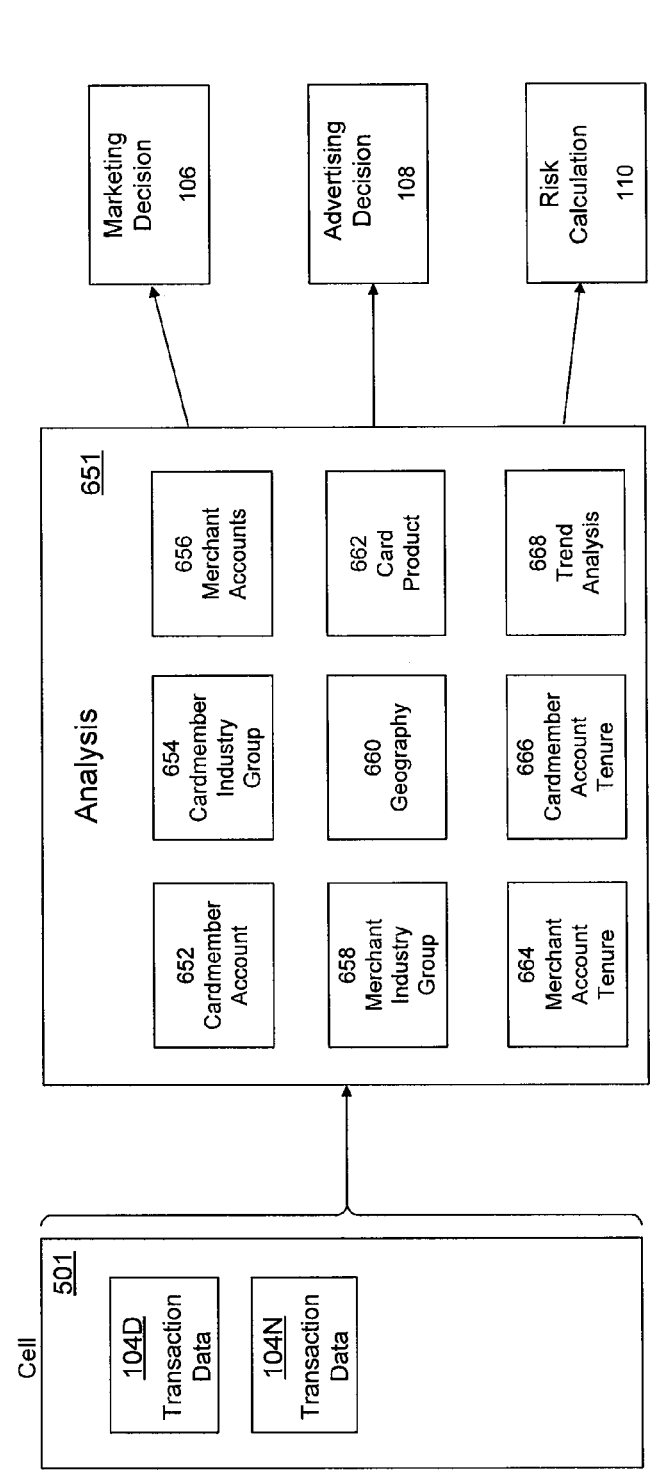
FIG. 6C illustrates an overview of analysis of transaction data.

FIG. 6C illustrates an overview 650 of an analysis 651 of transaction data 104 in cell 501. Cell 501 contains transaction data 104D and transaction data 104N. Analysis 651 may include determining any one of: number of cardmember accounts by cell 652, number of cardmember accounts by cardmember industry group 654, number of merchant accounts by cell 656, and number of merchant accounts by merchant industry group 658. Analysis 651 may further include filtering transaction data 104 by geography 660, card product 662, merchant account tenure 664, and cardmember account tenure 666. Filtering transaction data 104 is one way to segment a market between cardmember industry group 256 and merchant industry group 206. Spend mapping tool 102 may also perform trend analysis 668 of transaction data 104. Furthermore, analysis 651 may identify risk associated with a merchant-cardmember relationship. In an exemplary embodiment, analysis 651 determines an optimal ratio of price of advertising to return on advertising for each cell.

Results of analysis 651 may be input to at least one of marketing decision 106, advertising decision 108, and risk calculation 110. An exemplary marketing decision 106 may target an industry segment based upon results of analysis 651. Analysis results may also be input to advertising decision 108. Further, results of analysis 651 may be input to developing an industry strategy. Trend analysis 668 of transaction data 104 may be used to determine an effect of advertising on a market represented by a specific cell. An advertisement may be targeted to at least one of merchant 151 or cardmember 153 based upon analysis 651.

The spend mapping tool 102 creates a list of merchants 151 by merchant industry group 206. The spend mapping tool 102 also creates a list of names of cardmembers 153 by cardmember industry group 256. Further, a list of names of merchants 151 and cardmembers 153 whose transaction data 104 is in a particular cell may be generated. In various examples, results of analysis 651 may be output in spreadsheet form, in tabular form, on a graphical display, or printed.

Figure 7:
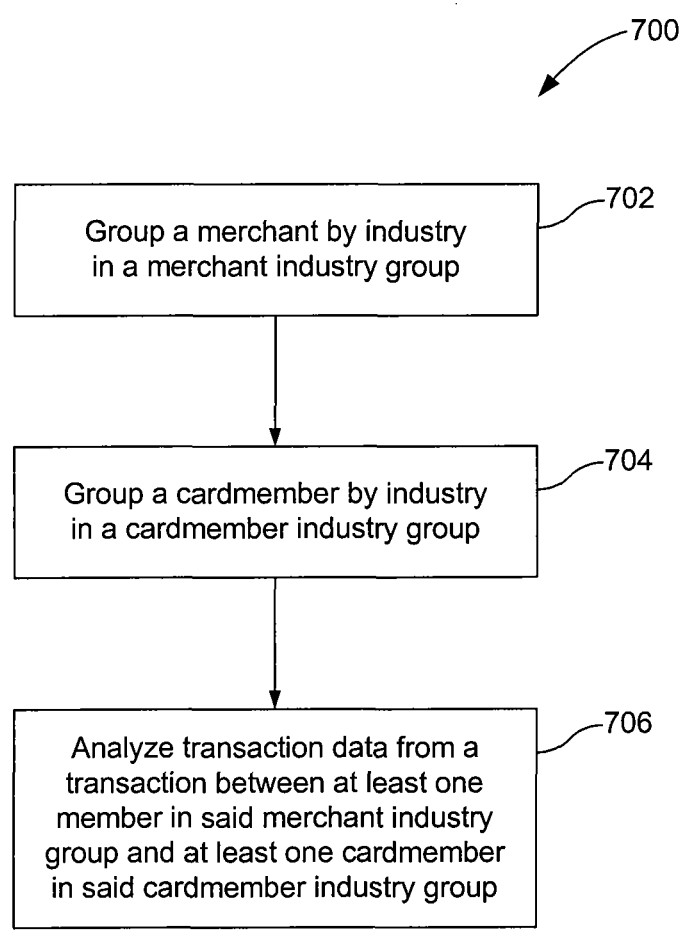
FIG. 7 is a flowchart of a process for analyzing transactions between merchants and cardmembers.

FIG. 7 illustrates an exemplary flowchart showing a process 700 for analyzing transaction 150. At step 702, merchant 151 is grouped by industry in merchant industry group 206. At step 704, cardmember 153 is grouped by industry in cardmember industry group 256. At least one of grouping of merchant 151 and grouping of cardmember 153 is by a standard industry classification (SIC) code.

At step 706, transaction data 104 from transaction 150 between at least one merchant 151 in merchant industry group 206 and at least one cardmember 153 in cardmember industry group 256 is analyzed. Transaction data 104 includes at least one of transaction value 164, number of transactions per merchant 454, number of transactions per cardmember 456, merchant geographical location 458, cardmember geographical location 460, merchant tenure 462, and cardmember tenure 464. Step 706 may include at least one of determining number of transactions 502, determining transaction amounts 602, determining number of cardmember accounts 652, determining number of merchant accounts 656, filtering by geography 660, filtering by card product 662, filtering by merchant account tenure 664, filtering by cardmember account tenure 666, listing merchant 151 by merchant industry group 206, listing cardmember 153 by cardmember industry group 256, and determining a trend 668 in transaction data 104.

Step 706 may further include targeting advertising by at least one of merchant 151 and cardmember 153. Step 706 may also form the basis for evaluating the effect of advertising to at least one of merchant 151 and cardmember 153. Transaction risk may also be determined based on step 706. Further, an industry strategy may be developed based on step 706.

The present invention or any part(s) or function(s) thereof may be implemented using hardware, software or a combination thereof and may be implemented in one or more computer systems or other processing systems. However, manipulations performed by the present invention were often referred to in terms, such as adding or comparing, which are commonly associated with mental operations performed by a human operator. No such capability of a human operator is necessary, or desirable in most cases, in any of the operations described herein which form part of the present invention. Rather, the operations are machine operations. Useful machines for performing the operation of the present invention include general purpose digital computers or similar devices.

Figure 8:
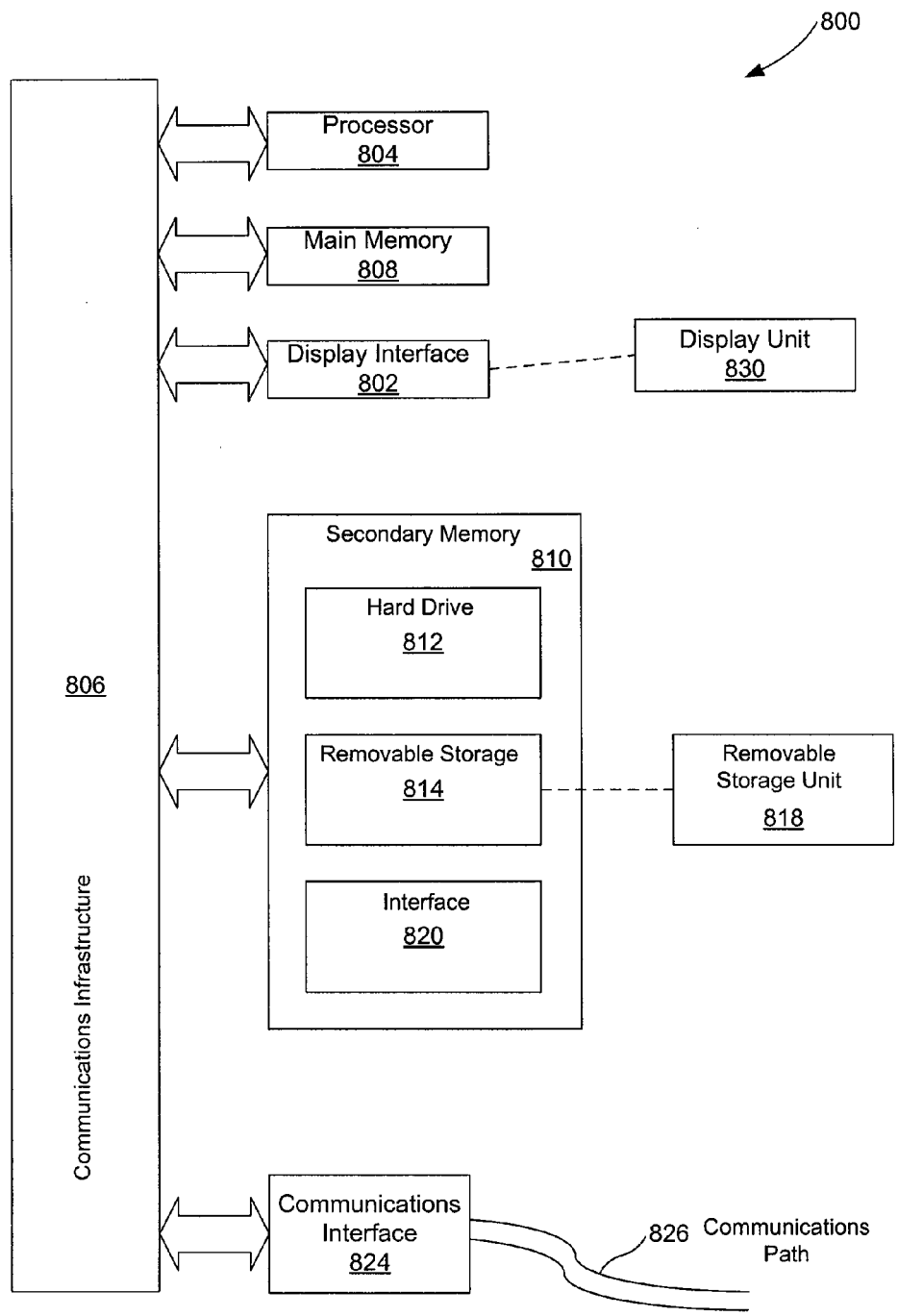
FIG. 8 is a block diagram of an exemplary computer system useful for implementing the present invention.

In one embodiment, the invention is directed toward one or more computer systems capable of carrying out the functionality described herein. An example of a computer system 800 is shown in FIG. 8. Computer system 800 includes one or more processors, such as processor 804. The processor 804 is connected to communication infrastructure 806 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 800 can include a display interface 802 that forwards graphics, text, and other data from communication infrastructure 806 (or from a frame buffer not shown) for display on display unit 830.

Computer system 800 also includes main memory 808, preferably random access memory (RAM), and may also include secondary memory 810. Secondary memory 810 may include, for example, hard disk drive 812 and/or removable storage drive 814, representing a floppy disk drive, a magnetic tape drive, an optical disk drive, etc. Removable storage drive 814 reads from and writes to removable storage unit 818 in a well known manner. Removable storage unit 818 represents a floppy disk, magnetic tape, optical disk, etc. which is read by and written to by removable storage drive 814. As will be appreciated, removable storage unit 818 includes a computer usable storage medium having stored therein computer software or data.

In alternative embodiments, secondary memory 810 may include other similar devices for allowing computer programs or other instructions to be loaded into computer system 800. Such devices may include, for example, removable storage unit 818 and interface 820. Examples of such may include a program cartridge and cartridge interface (such as that found in video game devices), a removable memory chip (such as an erasable programmable read only memory (EPROM), or programmable read only memory (PROM)) and associated socket, and other removable storage units 818 and interfaces 820, which allow software and data to be transferred from removable storage unit 818 to computer system 800.

Computer system 800 may also include communications interface 824. Communications interface 824 allows software and data to be transferred between computer system 800 and external devices. Examples of communications interface 824 may include a modem, a network interface (such as an Ethernet card), a communications port, a Personal Computer Memory Card International Association (PCMCIA) slot and card, etc. Software and data transferred via communications interface 824 are in the form of signals which may be electronic, electromagnetic, optical or other signals capable of being received by communications interface 824. These signals are provided to communications interface 824 via a communications path (e.g., channel) 826. This channel 826 carries the signals and may be implemented using wire or cable, fiber optics, a telephone line, a cellular link, a radio frequency (RF) link and other communications channels.

In this document, the terms "computer program medium" and "computer usable medium" are used to generally refer to media such as removable storage drive 814, a hard disk installed in hard disk drive 812. These computer program products provide software to computer system 800. The invention is directed in part to such computer program products.

Computer programs (also referred to as computer control logic) are stored in main memory 808 or secondary memory 810. Computer programs may also be received via communications interface 824. Such computer programs, when executed, enable computer system 800 to perform the features of the present invention, as discussed herein. In particular, the computer programs, when executed, enable processor 804 to perform the features of the present invention. Accordingly, such computer programs represent controllers of computer system 800.

In an embodiment where the invention is implemented using software, the software may be stored in a computer program product and loaded into computer system 800 using removable storage drive 814, hard drive 812 or communications interface 824. The control logic (software), when executed by processor 804, causes processor 804 to perform functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

III. Conclusion

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above described exemplary embodiments, but should be defined only in accordance with the following claims and their equivalents.

In addition, it should be understood that the figures and screen shots illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

Further, the purpose of the Abstract is to enable the U.S. Patent and Trademark Office and the public generally, and especially scientists, engineers, and practitioners in the art who are not familiar with patent or legal terms, to determine quickly from a cursory inspection the nature and essence of the technical disclosure of the application. The Abstract and Summary are not intended to be limiting as to the scope of the present invention in any way.

What is claimed is:
1. A method comprising:
grouping, by a computer processor for analyzing transactions between merchants and cardmembers, a merchant by industry in a merchant industry group;
grouping, by the computer processor, a cardmember by industry in a cardmember industry group, wherein the cardmember is a business organization; and
analyzing, by the computer processor, transaction data from a transaction between at least one merchant in said merchant industry group and at least one cardmember in said cardmember industry group, wherein the analyzing comprises determining an aggregate transaction value over a period of time between the merchant and the cardmember, wherein the analyzing further comprises filtering by cardmember account tenure and by merchant account tenure, wherein cardmember account tenure comprises a period of time during which the cardmember has held open a cardmember transaction account, and wherein merchant account tenure comprises a period of time during which the merchant has held open a merchant transaction account, developing, by the computer processor, an industry strategy based upon the analysis; and targeting, by the computer processor, a first advertisement to said merchant and a second advertisement to said cardmember.

2. The method of claim 1, wherein at least one of said grouping of said merchant and said grouping of said cardmember is by a standard industry classification (SIC) code.

3. The method of claim 1, wherein said analyzing includes at least one of:
- determining a number of transactions;
- determining a transaction amount;
- determining a number of cardmember accounts;
- determining a number of merchant accounts;
- filtering by geography;
- filtering by card product;
- filtering to segment a market;
- listing said merchant by said merchant industry group;
- listing said cardmember by said cardmember industry group; and
- determining a trend in transaction data over time.

4. The method of claim 1, wherein said transaction data includes at least one of:
- a transaction amount;
- a number of transactions per merchant;
- a number of transactions per cardmember;
- a merchant geographical location;
- a cardmember geographical location,
- a merchant tenure; and
- a cardmember tenure.

5. The method of claim 1, wherein said industry strategy comprises at least one of:
- identifying a risk associated with the merchant and the cardmember; and
- determining an optimal ratio of price of advertising to return on advertising.

6. The method of claim 1, further including evaluating an advertisement to at least one of said merchants and said cardmembers based on said analyzing step.

7. The method of claim 1, further including determining a transaction risk based on said analyzing step.

8. A system comprising:
- a processor for analyzing transaction between merchants and cardmembers;
- a tangible, non-transitory memory configured to communicate with the processor,
- the tangible, non-transitory memory having instructions stored thereon that, in response to execution by the processor, cause the processor to perform operations comprising:
  - grouping, by the processor, a merchant by industry in a merchant industry group;
  - grouping, by the processor, a cardmember by industry in a cardmember industry group, wherein the cardmember is a business organization; and
  - analyzing, by the processor, transaction data from a transaction between at least one merchant in said merchant industry group and at least one cardmember in said cardmember industry group,
  - wherein the analyzing comprises determining an aggregate transaction value over a period of time between the merchant and the cardmember,
  - wherein the analyzing further comprises filtering by cardmember account tenure and by merchant account tenure, wherein cardmember account tenure comprises a period of time during which the cardmember has held open a cardmember transaction account, and wherein merchant account tenure comprises a period of time during which the merchant has held open a merchant transaction account,
  - developing, by the processor, an industry strategy based upon the analysis; and
  - targeting, by the processor, a first advertisement to said merchant and a second advertisement to said cardmember.

9. The system of claim 8, wherein at least one of said grouping of said merchant and said grouping of said cardmember is by a standard industry classification (SIC) code.

10. The system of claim 8, wherein said analyzing comprises at least one of:
- determining a number of transactions;
- determining a transaction amount;
- determining a number of cardmember accounts;
- determining a number of merchant accounts;
- filtering by geography;
- filtering by card product;
- filtering to segment a market;
- listing said merchant by said merchant industry group;
- listing said cardmember by said cardmember industry group; and
- determining a trend in transaction data over time.

11. The system of claim 8, wherein said transaction data includes at least one of:
- a transaction amount;
- a number of transactions per merchant;
- a number of transactions per cardmember;
- a merchant geographical location;
- a cardmember geographical location,
- a merchant tenure; and
- cardmember tenure.

12. The system of claim 8, wherein said industry strategy comprises at least one of:
- identifying a risk associated with the merchant and the cardmember; and
- determining an optimal ratio of price of advertising to return on advertising.

13. An article of manufacture including a non-transitory, tangible computer readable storage medium having instructions stored thereon that, in response to execution by a computer-based system for analyzing transactions between merchants and cardmembers, cause the computer-based system to be capable of performing operations comprising:
- grouping, by the computer-based system, a merchant by industry in a merchant industry group;
- grouping, by the computer-based system, a cardmember by industry in a cardmember industry group, wherein the cardmember is a business organization; and
- analyzing, by the computer-based system, transaction data from a transaction between at least one merchant in said merchant industry group and at least one cardmember in said cardmember industry group, wherein the analyzing comprises determining an aggregate transaction value over a period of time between the merchant and the cardmember, wherein the analyzing further comprises filtering by cardmember account tenure and by merchant account tenure, wherein cardmember account tenure comprises a period of time during which the cardmember has held open a cardmember transaction account, and wherein merchant account tenure comprises a period of time during which the merchant has held open a merchant transaction account, developing, by the computer-based system, an industry strategy based upon the analysis; and targeting, by the computer-based system, a first advertisement to said merchant and a second advertisement to said cardmember.

14. The article of manufacture of claim 13, wherein at least one of said grouping of said merchant and said grouping of said cardmember is by a standard industry classification (SIC) code.

15. The article of manufacture of claim 13, wherein said analyzing comprises:
determining a number of transactions;
determining a transaction amount;
determining a number of cardmember accounts;
determining a number of merchant accounts;
filtering by geography;
filtering by card product;
filtering to segment a market;
listing said merchant by said merchant industry group;
listing said cardmember by said cardmember industry group; and
determining a trend in transaction data over time.

16. The article of manufacture of claim 13, wherein said transaction data includes at least one of:
a transaction amount;
a number of transactions per merchant;
a number of transactions per cardmember;
a merchant geographical location;
a cardmember geographical location,
a merchant tenure; and
a cardmember tenure.

17. The article of manufacture of claim 13, wherein said industry strategy comprises at least one of:
identifying a risk associated with the merchant and the cardmember; and
determining an optimal ratio of price of advertising to return on advertising.

* * * * *